United States Patent
Kurilov et al.

(10) Patent No.: US 10,146,600 B2
(45) Date of Patent: Dec. 4, 2018

(54) MUTABLE DATA OBJECTS CONTENT VERIFICATION TOOL

(71) Applicant: EMC Corporation, Hopkinton, MA (US)

(72) Inventors: Andrey Kurilov, Saint Petersburg (RU); Mikhail Danilov, Saint Petersburg (RU); Alexander Rakulenko, Saint Petersburg (RU); Kirill Gusakov, Saint Petersburg (RU); Andrey Fomin, Vesevolozhsk (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 205 days.

(21) Appl. No.: 15/193,144

(22) Filed: Jun. 27, 2016

(65) Prior Publication Data
US 2017/0177249 A1    Jun. 22, 2017

(30) Foreign Application Priority Data
Dec. 16, 2015   (RU) ................................ 2015153848

(51) Int. Cl.
  *G06F 11/00* (2006.01)
  *G06F 11/07* (2006.01)
  *G06F 11/263* (2006.01)

(52) U.S. Cl.
  CPC ...... *G06F 11/0709* (2013.01); *G06F 11/0727* (2013.01); *G06F 11/0751* (2013.01); *G06F 11/0793* (2013.01); *G06F 11/263* (2013.01)

(58) Field of Classification Search
  CPC .. G06F 11/0727; G06F 11/0751; G06F 11/24; G06F 11/263; G06F 11/26; G06F 11/0709; G06F 3/0619; G06F 3/0653; G06F 3/067
  See application file for complete search history.

(56) References Cited

U.S. PATENT DOCUMENTS

| | | |
|---|---|---|
| 6,070,003 A | 5/2000 | Gove et al. |
| 6,550,035 B1 | 4/2003 | Okita |
| 7,549,110 B2 | 6/2009 | Stek et al. |
| 7,559,007 B1 | 7/2009 | Wilkie |
| 7,581,156 B2 | 8/2009 | Manasse |
| 8,458,515 B1 | 6/2013 | Saeed |
| 8,532,212 B2 | 9/2013 | Ito |

(Continued)

OTHER PUBLICATIONS

U.S. Non-Final Office Action dated Oct. 5, 2017 for U.S. Appl. No. 15/193,407; 14 pages.

(Continued)

*Primary Examiner* — Joseph D Manoskey
(74) *Attorney, Agent, or Firm* — Daly, Crowley, Mofford & Durkee, LLP

(57) ABSTRACT

Data object content verification systems and processes provide perfect reliability and low storage overhead. Object data is generated in a reproducible manner based upon object locally stored object metadata. The object data is stored to an object storage system. The stored object data is subsequently verified by retrieving the object metadata, reproducing the original object data, and comparing the stored and original object data. The data object content verification systems and processes support both mutable and immutable data object content verification.

10 Claims, 7 Drawing Sheets

(56) References Cited

U.S. PATENT DOCUMENTS

| | | | |
|---|---|---|---|
| 8,683,296 | B2 | 3/2014 | Anderson et al. |
| 8,683,300 | B2 | 3/2014 | Stek et al. |
| 8,762,642 | B2 | 6/2014 | Bates et al. |
| 8,914,706 | B2 | 12/2014 | Anderson |
| 2005/0038968 | A1 | 2/2005 | Iwamura et al. |
| 2006/0105724 | A1 | 5/2006 | Nakao |
| 2006/0147219 | A1 | 7/2006 | Yoshino et al. |
| 2008/0126357 | A1 | 5/2008 | Casanova et al. |
| 2008/0307006 | A1* | 12/2008 | Lee ............... G06F 11/3684 |
| 2009/0112953 | A1 | 4/2009 | Barsness et al. |
| 2010/0091842 | A1 | 4/2010 | Ikeda et al. |
| 2010/0180176 | A1 | 7/2010 | Yosoku et al. |
| 2010/0246663 | A1 | 9/2010 | Citta et al. |
| 2011/0053639 | A1 | 3/2011 | Etienne Suanez et al. |
| 2011/0055494 | A1 | 3/2011 | Roberts et al. |
| 2011/0196900 | A1 | 8/2011 | Drobychev et al. |
| 2012/0051208 | A1 | 3/2012 | Li et al. |
| 2012/0106595 | A1 | 5/2012 | Bhattad et al. |
| 2013/0067187 | A1 | 3/2013 | Moss et al. |
| 2014/0046997 | A1 | 2/2014 | Dain et al. |
| 2016/0239384 | A1 | 8/2016 | Slik et al. |
| 2017/0046127 | A1 | 2/2017 | Fletcher et al. |
| 2017/0091085 | A1* | 3/2017 | Davis ............... G06F 11/3688 |

OTHER PUBLICATIONS

U.S. Non-Final Office Action dated Oct. 18, 2017 for U.S. Appl. No. 15/193,145; 21 pages.
U.S. Non-Final Office Action dated Sep. 15, 2017 for U.S. Appl. No. 15/193,409; 12 pages.
U.S. Appl. No. 15/281,172, filed Sep. 30, 2016, Trusov et al.
U.S. Appl. No. 15/398,832, filed Jan. 5, 2017, Danilov et al.
U.S. Appl. No. 15/398,826, filed Jan. 5, 2017, Danilov et al.
U.S. Appl. No. 15/398,819, filed Jan. 5, 2017, Danilov et al.
Anvin, "The Mathematics of RAID-6;" First Version Jan. 20, 2004; Last Updated Dec. 20, 2011; Retrieved from https://www.kernel.org/pub/linux/kernel/people/hpa/raid6.pdf; 9 Pages.
Blömer et al., "An XOR-Based Erasure-Resilient Coding Scheme;" Article from CiteSeer; Oct. 1999; 19 Pages.
U.S. Appl. No. 14/929,788, filed Nov. 2, 2015, Kurilov et al.
U.S. Appl. No. 15/083,324, filed Mar. 29, 2016, Danilov et al.
U.S. Appl. No. 15/193,141, filed Jun. 27, 2016, Danilov et al.
U.S. Appl. No. 15/186,576, filed Jun. 20, 2016, Malygin et al.
U.S. Appl. No. 15/193,145, filed Jun. 27, 2016, Fomin et al.
U.S. Appl. No. 15/193,407, filed Jun. 27, 2016, Danilov et al.
U.S. Appl. No. 15/193,142, filed Jun. 27, 2016, Danilov et al.
U.S. Appl. No. 15/193,409, filed Jun. 27, 2016, Trusov et al.
U.S. Appl. No. 15/620,892, filed Jun. 13, 2017, Danilov et al.
U.S. Appl. No. 15/620,897, filed Jun. 13, 2017, Danilov et al.
U.S. Appl. No. 15/620,898, filed Jun. 13, 2017, Danilov et al.
U.S. Appl. No. 15/620,900, filed Jun. 13, 2017, Danilov et al.
Office Action dated Nov. 27, 2017 from U.S. Appl. No. 15/186,576; 11 Pages.
Office Action dated Dec. 14, 2017 from U.S. Appl. No. 15/281,172; 9 Pages.
Response to Office Action dated Sep. 15, 2017 from U.S. Appl. No. 15/193,409, filed Dec. 14, 2017; 11 Pages.
Response to Office Action dated Oct. 5, 2017 from U.S. Appl. No. 15/193,407, filed Dec. 20, 2017; 12 Pages.
Response to Office Action dated Oct. 18, 2017 from U.S. Appl. No. 15/193,145, filed Jan. 17, 2018; 12 Pages.
U.S. Non-Final Office Action dated Feb. 2, 2018 for U.S. Appl. No. 15/398,826; 16 Pages.
Response to U.S. Non-Final Office Action dated Nov. 27, 2017 for U.S. Appl. No. 15/186,576, filed Feb. 23, 2018; 7 pages.
U.S. Final Office Action dated Mar. 1, 2018 for U.S. Appl. No. 15/193,145; 32 pages.
U.S. Final Office Action dated Mar. 2, 2018 for U.S. Appl. No. 15/193,409; 10 pages.

* cited by examiner

MUTABLE DATA OBJECTS CONTENT VERIFICATION TOOL

CROSS REFERENCE TO RELATED APPLICATIONS

This application claims priority to Russian Application Number 2015153848, filed on Dec. 16, 2015, and entitled "MUTABLE DATA OBJECTS CONTENT VERIFICATION TOOL," which is incorporated herein by reference in its entirety.

BACKGROUND

Data storage vendors offer a wide range of data storage systems. When new features or other changes are made to a data storage system, thorough testing is performed to maintain outstanding storage quality. For example, at each release development cycle, endurance testing may be performed. One goal of endurance testing is to verify that the content of stored objects is not corrupted with a lapse of time. To facilitate endurance testing, a testing tool may generate many large data objects (further referred to herein as "objects"), store these objects within the storage system, and subsequently read the objects back from storage and verify their contents. In between creating and verifying a given object, a large number of I/O operations may be performed over some relatively long time period, including creating and deleting other objects.

To verify stored object content, a common approach is to calculate a checksum over the object's data and to store the checksum locally, such as to a local disk or other type of non-volatile memory, along with an object ID. When the object is read back, a second checksum is calculated over the stored object data and compared with the locally stored checksum. If the checksums are equal, the object content is verified. Otherwise, the object is reported as corrupted. Because checksums are not one-to-one functions (i.e., the same checksum can be computed for different data), object content verification using checksums is not 100% reliable. In addition, checksums cannot be used to determine the specific data within the object that was corrupted, complicating root cause analysis.

Another approach is to store a replica of each object locally. Although this approach is reliable, it is typically impractical due to the high storage overhead.

In addition to storing new objects, object storage systems may support modifying the contents of existing objects.

SUMMARY

It is appreciated herein that there is a need for object content verification systems and processes that are reliable and have reasonable storage overhead, and that support verification of mutable data object storage, in addition to immutable data object storage.

Described herein are systems and processes to verify that an object storage system correctly stores data objects, including data objects that are mutated during testing. The described systems and processes provide highly reliable and high performance data object content verification and high performance, and require relatively little storage.

In accordance with one aspect of the invention, a method for use with a distributed object storage system comprises: generating, in a processor, a plurality of object IDs and corresponding original object metadata; for each object ID, generating corresponding original object data in a reproducible manner based upon the corresponding original object metadata; storing the corresponding original object metadata to a metadata storage device and writing the corresponding original object data to the distributed object storage system; selecting a plurality of the object IDs to be mutated from the plurality of object. The method may also include, for the object IDs to be mutated: generating corresponding mutated object data in a reproducible manner based upon corresponding mutated object metadata; storing the corresponding mutated object metadata to the metadata storage device and writing the mutated object data to the distributed object storage system; retrieving the object ID and mutated object metadata from the metadata storage device; reproducing the mutated object data using the mutated object metadata; and comparing the reproduced mutated object data to the retrieved object data to identify corruption in the distributed object storage system.

In some embodiments, generating object data in a reproducible manner based upon object metadata comprises generating object data based upon a first object size. Generating mutated object data in a reproducible manner based upon mutated object metadata may include generating mutated object data based upon a second object size greater than the first object size. In certain embodiments, mutated object metadata comprises an updated object ID and a bitmask.

In some embodiments of the method, reproducing the mutated object data using the mutated object metadata comprises: reproducing original object data using the original object metadata; generating updated object data using the updated object ID; and combining the reproduced original data and the updated object data according to the bitmask to reproduce the mutated object data.

In various embodiments, mutated object metadata comprises an ordered list of updated object ID and bitmask tuples. Reproducing the mutated object data using the mutated object metadata may include: reproducing original object data using the original object metadata; for each tuple in the ordered list of updated object ID and bitmask tuples, iteratively generating updated object data using the updated object ID and combining the reproduced original data and the updated object data according to the bitmask to generate the reproduce the mutated object data.

In accordance with another aspect of the invention, a system for use with a distributed object storage system comprises a content generator, an object creator, an object mutator, and a content verifier.

The content generator may be configured to generate object data in a reproducible manner based upon corresponding object metadata.

The object creator may be configured to: generate a plurality of object IDs and corresponding original object metadata; for each object ID, generate corresponding original object data using the content generator and the corresponding original object metadata; store the corresponding original object metadata to a metadata storage device; and write the corresponding original object data to the distributed object storage system.

The object mutator may be configured to: select a plurality of the object IDs to be mutated from the plurality of object; and for the object IDs to be mutated, generate corresponding mutated object data in a reproducible manner using the content generator and the mutated object metadata, store the corresponding mutated object metadata to the metadata storage device, and write the mutated object data to the distributed object storage system.

The content verifier may be configured to, for the object IDs to be mutated: retrieve the object ID and mutated object metadata from the metadata storage device; reproduce the mutated object data using the mutated object metadata; and compare the reproduced mutated object data to the retrieved object data to identify corruption in the distributed object storage system.

In some embodiments, the original object metadata comprises a first object size. The mutated object metadata may include a second object size greater than the first object size.

In certain embodiments, mutated object metadata comprises an updated object ID and a bitmask. Here, the content verifier may be configured to: reproduce original object data using the original object metadata; generate updated object data using the updated object ID; and combine the reproduced original data and the updated object data according to the bitmask to reproduce the mutated object data.

In some embodiments, mutated object metadata comprises an ordered list of updated object ID and bitmask tuples. The content verifier may be configured to: reproduce original object data using the original object metadata; for each tuple in the ordered list of updated object ID and bitmask tuples, iteratively generate updated object data using the updated object ID and combine the reproduced original data and the updated object data according to the bitmask to generate the reproduce the mutated object data.

BRIEF DESCRIPTION OF THE DRAWINGS

The concepts, structures, and techniques sought to be protected herein may be more fully understood from the following detailed description of the drawings, in which.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the systems and methods sought to be protected herein, some terms are explained. As used herein, the phrases "computer," "computing system," "computing environment," "processing platform," "data memory and storage system," and "data memory and storage system environment" are intended to be broadly construed so as to encompass, for example, private or public cloud computing or storage systems, or parts thereof, as well as other types of systems comprising distributed virtual infrastructure and those not comprising virtual infrastructure. The terms "application," "program," "application program," and "computer application program" herein refer to any type of software application, including desktop applications, server applications, database applications, and mobile applications.

As used herein, the term "storage device" refers to any non-volatile memory (NVM) device, including hard disk drives (HDDs), flash devices (e.g., NAND flash devices), and next generation NVM devices, any of which can be accessed locally and/or remotely (e.g., via a storage attached network (SAN)). The term "storage device" can also refer to a storage array comprising one or more storage devices.

The term "perfect" as used herein in conjunction with verification reliability means verification that is 100% reliable under normal operating conditions. The term "imperfect" as used herein to refer to verification reliability means verification that is less than 100% reliable.

Figure 1:
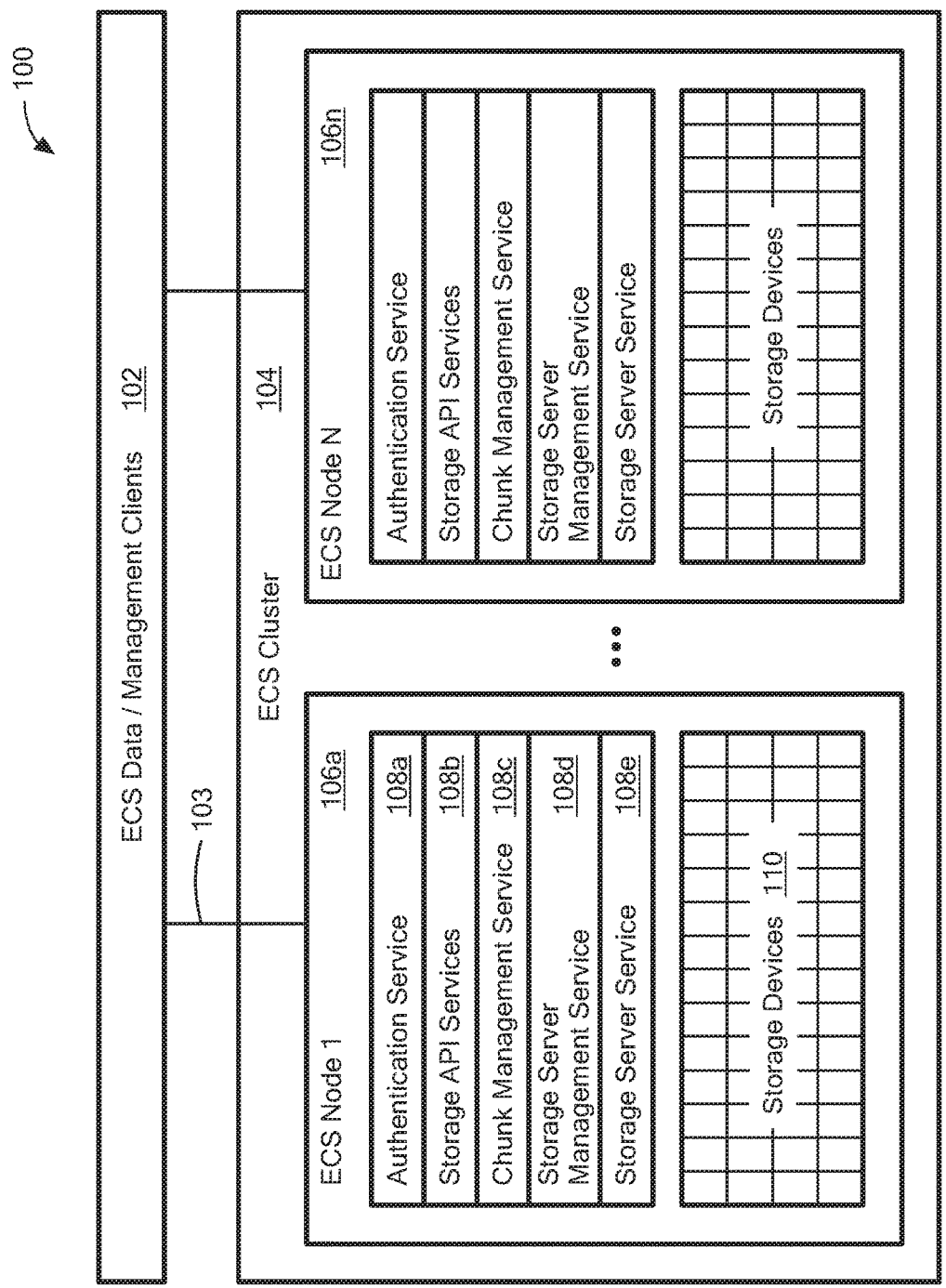
FIG. 1 is a block diagram of an illustrative object storage system, in accordance with an embodiment of the disclosure.

Referring to FIG. 1, an illustrative object storage system 100 in accordance with an embodiment of the disclosure includes one or more clients 102 in communication with a storage cluster 104 via a network 103. The network 103 may include any suitable type of communication network or combination thereof, including networks using protocols such as Ethernet, Internet Small Computer System Interface (iSCSI), Fibre Channel (FC), and/or wireless protocols. The clients 102 may include user applications, application servers, data management tools, and/or testing systems. In some embodiments, one or more of the clients 102 corresponds to the testing system shown in FIG. 2 and described below in conjunction therewith.

The storage cluster 104 includes one or more storage nodes 106a ... 106n (generally denoted 106). Storage node 106a, which may be representative of other storage nodes, includes one or more services 108 and one or more storage devices 108. A storage node 106 may include a processor (not shown) configured to execute the services 108.

The illustrative storage node 106a includes the following services: an authentication service 108a to authenticate requests from clients 102; storage API services 108b to parse and interpret requests from clients 102; a chunk management service 108c to facilitate chunk allocation/reclamation for different storage system needs and monitor chunk health and usage; a storage server management service 108d to manage available storage devices capacity and to track storage devices states; and a storage server service 108e to interface with the storage devices 110.

A storage device 110 may comprise one or more physical and/or logical storage devices attached to the storage node 106a. A storage node 106 may utilize VNX, Symmetrix VMAX, and/or Full Automated Storage Tiering (FAST), which are available from EMC Corporation of Hopkinton, Mass. While vendor-specific terminology may be used to facilitate understanding, it is understood that the concepts, techniques, and structures sought to be protected herein are not limited to use with any specific commercial products.

In general operation, clients 102 issue requests to the storage cluster 104 to read and write data objects (or more simply "objects"). Write requests may include requests to create new objects within the storage cluster 104, as well as requests to update (or "mutate") existing objects. Data object read and write requests include an object ID, which uniquely identifies the object within the storage cluster 104. A client request may be received by any available storage node 106. The receiving node 106 may process the request locally and/or may delegate request processing to one or more peer nodes 106. For example, if a client issues an object read request, the receiving node may delegate/proxy the request to peer node where the object's data resides.

In some embodiments, the storage cluster 104 utilizes Elastic Cloud Storage (ECS) from EMC Corporation of Hopkinton, Mass.

FIGS. 2-7 illustrate systems and processes for data object verification that can be used to test object storage systems (e.g., object storage system 100 of FIG. 1). The systems and processes utilize a technique (referred to herein as "Weightless Verification") whereby object contents can be regenerated for verification using metadata associated with that object. As such, testing systems that utilize Weightless Verification need not store the entire content of an object, or even a checksum thereof, in order to achieve reliable verification. It is enough to store metadata that can be used later to reproduce the original object contents exactly.

As shown in TABLE 1, Weightless Verification provides both high reliability and low storage head compared to existing techniques.

TABLE 1

|  | Verification Reliability | Storage Overhead |
| --- | --- | --- |
| Object copy | Perfect | High |
| Checksum | Imperfect | Medium/Low |
| Weightless Verification | Perfect | Low |

Figure 2:
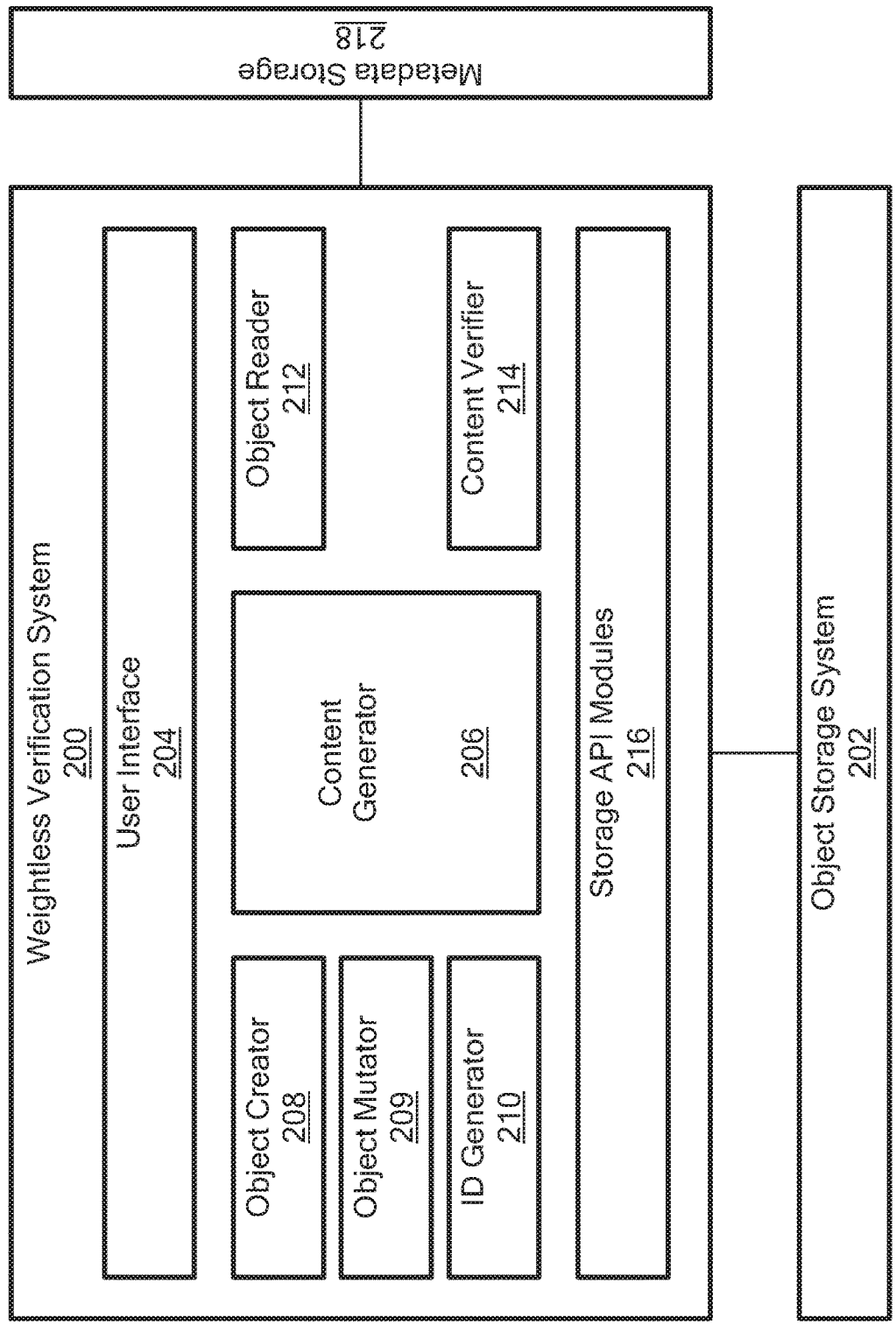
FIG. 2 is a block diagram of an illustrative system that can be used to test an object storage system, in accordance with an embodiment of the disclosure.

Referring to FIG. 2, a testing system 200 utilizing Weightless Verification can be used to efficiently test an object storage system 202, which may be the same as or similar to object storage system 100 of FIG. 1. In accordance with an embodiment of the disclosure, an illustrative testing system 200 includes a user interface 204, a content generator 206, an object creator 208, an object mutator 209, an ID generator 210, an object reader 212, a content verifier 214, and storage API modules 216.

The testing system 200 has read/write access to a storage device 218 for storing object metadata, such as object IDs and sizes. The storage device 218 (referred to herein as "metadata storage") is distinct from the object storage system 202 and may be provided, for example, as a locally attached disk drive. In some embodiments, metadata storage 218 may be provided as volatile or non-volatile memory.

The user interface 204 may include graphical and/or textual-based interfaces to allow a user to configure tests, to execute tests against the object storage system 202, and to view the results of such tests.

The various system components 204-216 are configured to interact to generate data objects, to store data objects within the object storage system 202, and to subsequently verify the contents of stored data objects. In addition, the components 204-216 are operable to modify the contents of existing stored objects and to subsequently verify the contents of modified objects. The testing system 200 can efficiently generate, mutate, and verify a large number of data objects (e.g., thousands or even millions of objects), and thus is well suited for endurance testing, stress testing, and other types of testing.

The operation of the system 200 can be understood in terms of three distinct operations: object creation, object modification, and object verification. Although detailed descriptions of these operations are provided below in conjunction with FIGS. 3-7, a brief overview is given herein. It should be understood that the three operations can be used in any desired combination and not all operation are necessarily used in all embodiments. For example, when verifying that an object storage system properly stores immutable objects, the object modification operation may be unused.

During object creation, the testing system 200 can generate and store verifiable objects as follows. The object creator 208 requests a new object ID from the ID generator 210. Any suitable technique may be used to generate object IDs, including maintaining a count in memory or generating random (or pseudo-random) values.

Next, the object creator 208 requests object content from the content generator 206. In various embodiments, the request includes a key and an object size. The content generator 206 returns a stream of data that is reproducible based on the key and the object size. In this example, the object ID is used as the key to generate object data, although it should be appreciated that a separate value could be used as the key.

The content generator 206 can use any suitable technique to generate content in a reproducible manner. For testing purposes, it may be desirable to store objects having random or at least pseudo-random content. In some embodiments, the content generator 206 generates object data using a pseudo-random number generator (PRNG). Here, the content generator 206 may seed a PRNG using the object ID value, and then invoke the PRNG one or more times to generate a stream of random data having the specific size. In other embodiments, the content generator 206 uses pre-generated data stored in a ring buffer to provide a pseudo-random stream of data. Here, the object ID can be used (either directly or indirectly) to index into the ring buffer.

Next, the object creator 208 creates an object within the object storage system 202. This may include sending the object ID and generated object data to the object storage system 202 with an object write request. To provide a layer of abstraction between the object creator 208 and the object storage system 202, the testing system 200 may include one include one or more storage API modules 216 (shown in FIG. 2) via which the object creator 208 indirectly issues requests to the object storage system 202. This allows new types of object storage systems 202 to be tested by simply adding an API module 216.

The object creator 208 writes the object ID and the object size to metadata storage 218. In some embodiments, this is done after the object storage system 200 acknowledges creation of the object. In some embodiments, the object metadata is stored as comma-separated values (CSV).

During object modification, the testing system 200 receives requests to modify one or more objects previously stored within the object storage system 202. Those skilled in the art will understand that existing object storage systems may provide an API to modify objects. For example, Amazon S3, EMC Atmos, and OpenStack Swift APIs may use HTTP PUT for this purpose. The illustrative system 200 distinguishes between two types of object modifications: "appends" and "updates." An append operation adds data (e.g., an array of bytes) to the end of an existing object. The existing (or "original") object data is not mutated and the size of the object increases. The added data is referred to as an "appendage" and the size of the resulting object is equal to the original object size plus the appendage size. In contrast, an update operation modifies the contents of an existing object but does not change its size.

Thus, referring to the illustrative system 200 of FIG. 2, when an object modification request is made by a user, the object mutator 209 may determine whether the modification is an append or an update. In either case, the system 200 uses the object ID to retrieve existing metadata from metadata storage 218 and uses the object ID along with object metadata (e.g., the object size) to reproduce the original object data. The original object data is then mutated using new data from the content generator 206 and the modified object data is stored within the object storage system 202. New or updated object metadata is then stored to metadata storage 218.

During object verification, the testing system 200 verifies the content objects within the object storage system 202. For a given object to be verified, the object reader 212 reads an object ID and corresponding object size from metadata storage 218. The object reader 212 requests the content generator 206 to reproduce the original object contents using the object ID and object size. The content generator 206 returns a data stream that exactly matches the original object content stored by the object creator 208.

The object reader 212 reads the stored object back from the object storage system 202 by object ID. In some embodiments, the object reader 212 receives data from the content generator 206 and object storage system 202 in parallel.

The object reader 212 passes the two data streams to the content verifier 214, which compares them using any suitable technique (e.g., byte-by-byte comparison). If the data streams are identical, the object passes verification. Otherwise, object corruption is detected and may be reported, for example, by displaying an error message within the user interface 204.

It will be appreciated that Weightless Verification has relatively low I/O and processing overhead compared to existing object content verification techniques. For example, existing systems that use object copies must read the original object from local storage, whereas Weightless Verification regenerates the original object data without slow disk read operations. As another example, existing systems that rely on checksums (e.g., MD5) must perform relatively complex computation a checksum, whereas implementations of Weightless Verification described herein use a ring buffer to retrieve original object data and simple comparison operations to provide fast verification.

The content verification techniques and structures described herein can be used to create testing systems for many different commercially available storage systems, including not only object-based storage systems but also file- and block-based storage systems.

Figure 3:
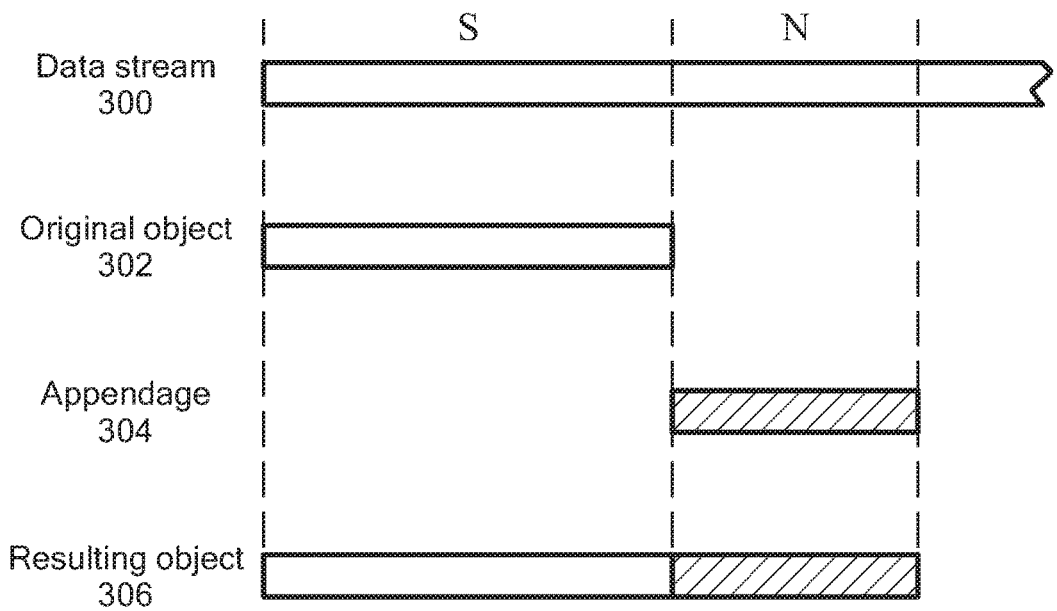
FIG. 3 is a diagram showing an illustrative process for appending data to a test object, in accordance with an embodiment of the disclosure.

FIG. 3 illustrates how data can be appended to an existing (or "original") test object in accordance with an embodiment of the disclosure. A request to append data may include two parameters: the existing object's ID and the size of the appendage (N), which may be specified in bytes or other unit of data. The original object size (S) can be retrieved from metadata storage. The original object 302 can be thought of as the firsts S bytes of a pseudo-random data stream 300 that can be reproduced using the object ID.

When a request is made to append N bytes to the original object 302, the object ID can be used to reproduce the data stream 300. The first S bytes of this stream (e.g., bytes 1 . . . S) were used to form the original object 302. The next N bytes of the same data stream 300 (e.g., bytes S+1 . . . S+N) are used to generate the appendage 304. Thus, the resulting modified object 306 can also be described and reproduced using two parameters: the object ID and the resulting object size (S'=S+N).

The resulting object 306 can be stored in the object storage system and the new object size (S') can be stored in metadata storage and used to reproduce the modified object when verification is requested. It will be appreciated that this approach extends naturally to support arbitrary number of append calls and that appending does not increase the per-object metadata storage overhead.

Figure 4:
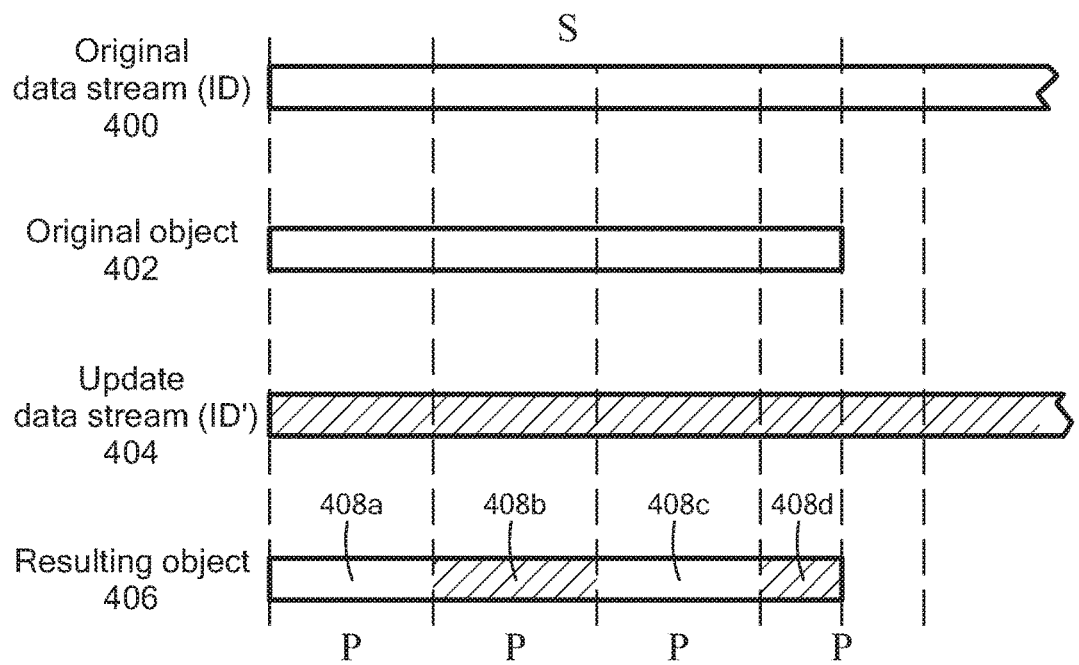
FIG. 4 is a diagram showing an illustrative process for updating the contents of a test object, in accordance with an embodiment of the disclosure.

FIG. 4 illustrates updating data within an existing test object 402 in accordance with an embodiment of the disclosure. Assume the existing (or "original") object 402 was generated using a pseudo-random data stream 400, based on an original object ID (ID) and an object size (S). To provide realistic testing scenarios, it may be desirable to replace one or more regions of the original object data with different data. The replacement regions be specified within an update request or could be determined by the testing system (e.g., in a random or systematic fashion).

In various embodiments, a new pseudo-random reproducible data stream (referred to as the "update data stream") 404 is generated using a second ID value (referred to as the "update ID" and denoted ID'). The update ID (ID') can be determined using any suitable technique, such as one described above in conjunction with the ID generator 210 of FIG. 2. In some embodiments, the testing system guarantees that the update ID (ID') is different from the original object ID (ID) and, as a result, that the two data streams 400, 404 are different.

The update data stream 404 is combined with the original object 402 to produce the resulting object 406. More specifically, the replacement regions within the resulting object 406 are filled with data taken from corresponding regions of the update data stream 404. For all other regions, the resulting object 406 is identical to the original object 402. In the simplified example of FIG. 4, regions 408a and 408c of the resulting object data 406 match the same regions of the original object 402, whereas regions 408b and 408d match those regions of the update data stream 404.

The resulting object 406 can be stored within the object storage system. To allow reproduction of the modified object during verification, the update ID (ID') and the replacement regions can be stored to metadata storage, along with original object ID (ID) and the object size (S). Because each update is relative to the previous object state, successive updates require storing additional metadata. Thus, metadata storage overhead may be a concern when verifying a large number of objects and/or updates.

To reduce metadata storage requirements, objects may be logically divided into a set of fixed-size ranges. In the simplified example of FIG. 4, the original object 402 can be viewed has having four ranges 408a-408 of equal size (P), where the last range 408d is partially filled. During an update operation, each replacement regions correspond to one of the fixed-size ranges. Because the ranges are fixed-size, the starting location of each range can be calculated on the fly. This in turn allows the replacement regions to be specified using an efficient data structure. In various embodiments, replacement regions are specified using a bitmask, where "1"s in the bitmask indicate the position of the fixed-size replacement regions. For example, in FIG. 4, the replacement regions 408b and 408d could be expressed as a bitmask 0101.

The ability to use bitmasks reduces the metadata storage requirements. For example, for a given object, a series of update operations can be represented as an ordered list of tuples: (ID', mask'), (ID", mask"), etc.

It will be appreciated that the approach to object mutation used by the object testing systems and processes disclosed herein is reliable and low overhead in terms of processing and storage requirements. In particular, no new per-object metadata needs to be stored to support append operations and update operations require relatively little additional metadata storage.

Figure 5:
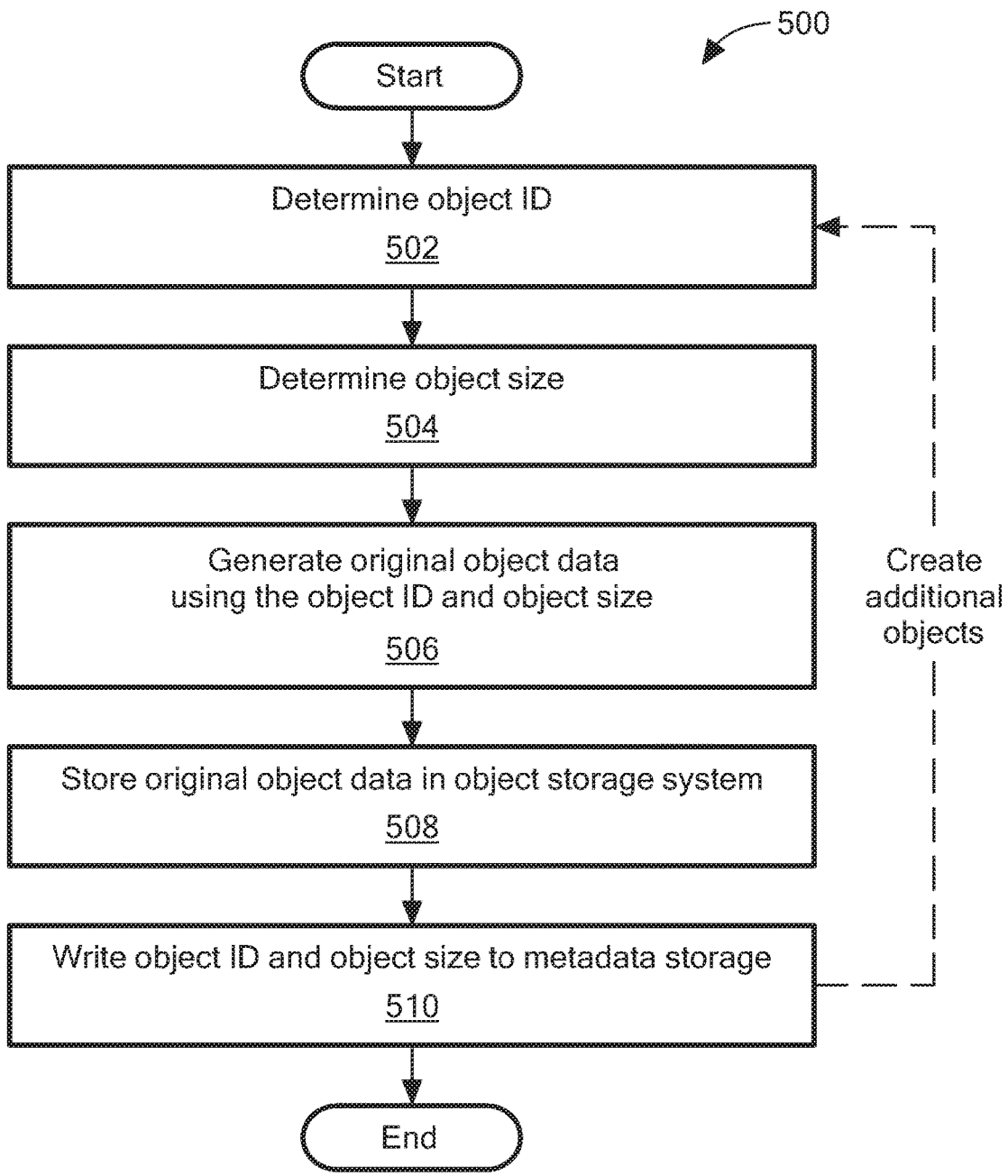
FIG. 5 is a flow diagram showing an illustrative process for creating test objects, in accordance with an embodiment of the disclosure.
Figure 6:
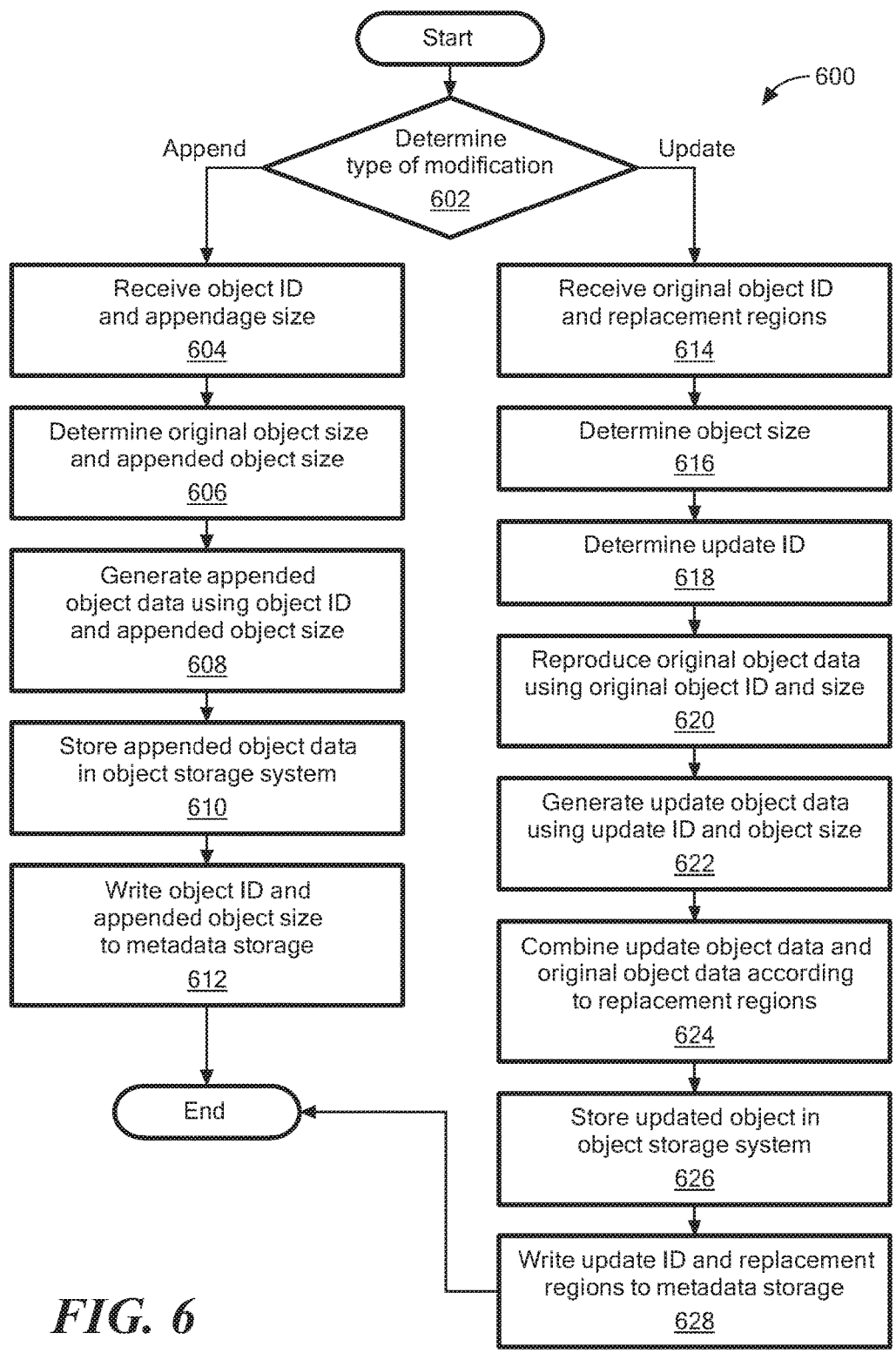
FIG. 6 is a flow diagram showing an illustrative process for appending data to a test object, in accordance with an embodiment of the disclosure.
Figure 7:
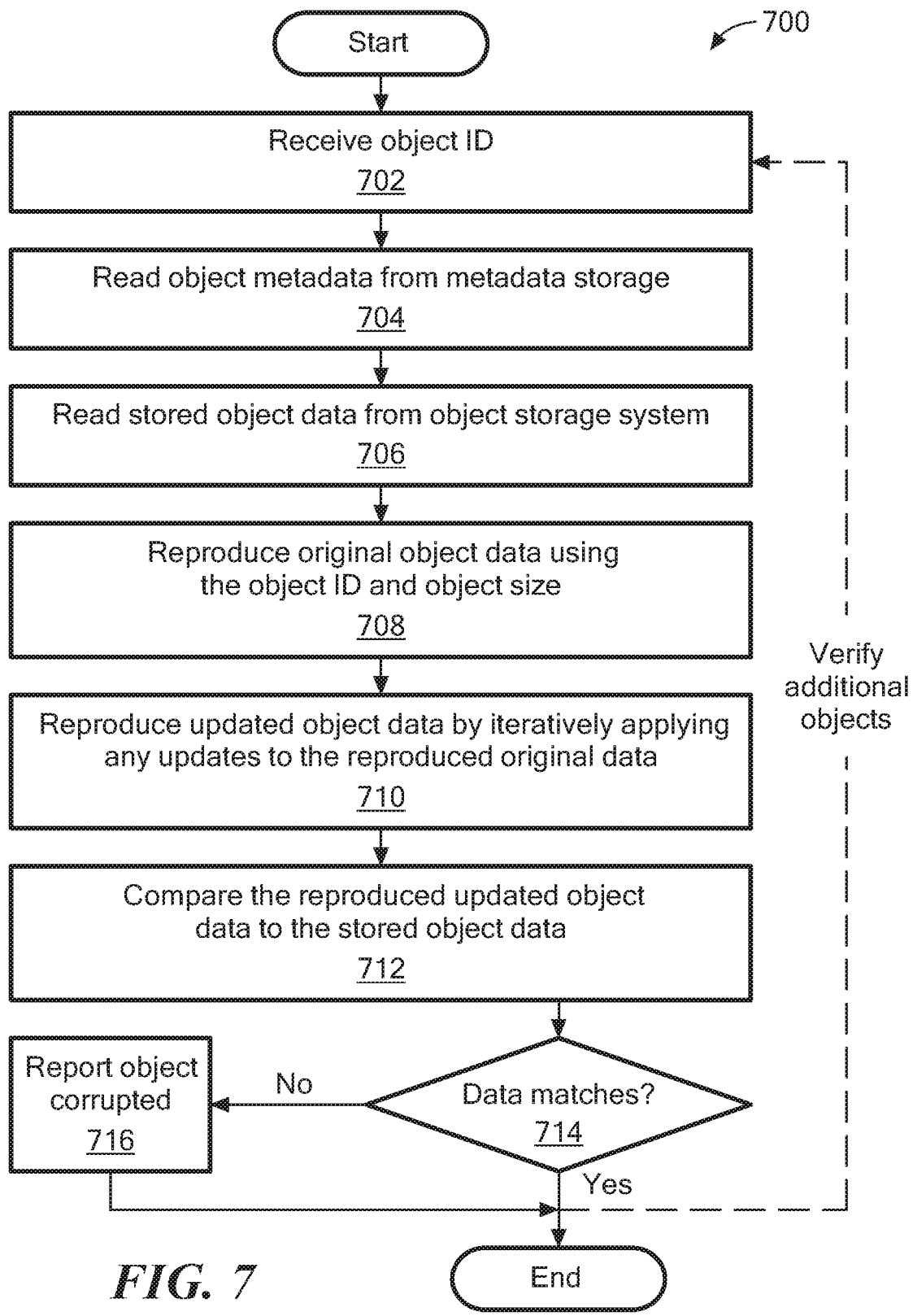
FIG. 7 is a flow diagram showing an illustrative process for updating the contents of a test object, in accordance with an embodiment of the disclosure.

FIGS. 5-7 are flow diagrams showing illustrative processing that can be implemented within a objection verification and testing system, such as system 200 of FIG. 2.

Rectangular elements (typified by element 502 in FIG. 5), herein denoted "processing blocks," represent computer software instructions or groups of instructions. Diamond shaped elements (typified by element 602 in FIG. 6), herein denoted "decision blocks," represent computer software instructions, or groups of instructions, which affect the execution of the computer software instructions represented by the processing blocks.

Alternatively, the processing and decision blocks may represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered meaning that, when possible, the functions represented by the blocks can be performed in any convenient or desirable order.

In some embodiments, the processing and decision blocks represent states and transitions, respectively, within a finite-state machine, which can be implemented in software and/or hardware.

FIG. 5 shows a process for creating test objects, in accordance with an embodiment of the disclosure. An illustrative process 500 begins at block 502, where an object ID is determined. The object ID can be generated using any suitable technique, such as one described above in conjunction with the ID generator 210 of FIG. 2. At block 504, an object size is determined. In certain embodiments, the object size is specified by a user or automatically selected by a testing system. At block 506, object data is generated in a reproducible manner using the object ID and size. At block 508, the original object data is stored in an object storage system. This may include sending a write request to the object storage system with the object ID and the object data. At block 510, the object ID and size (and possibly other metadata) are stored to metadata storage. The processing of blocks 502-510 may be repeated to create additional verifiable test objects.

FIG. 6 shows a process for modifying a test object, in accordance with an embodiment of the disclosure. An illustrative process 600 for begins at block 602, where the type of modification is determined. If the modification is an append-type modification, processing proceeds to block 604 where the object ID and appendage size are determined. These values may be specified within a modification request, or could be determined in a random or systematic fashion. At block 606, the original object size is determined (e.g., retrieved from metadata storage) and the appended object size is calculated as the sum of the original object size and the appendage size. At block 608, the appended object data is generated using the object ID and the appended object size. At block 610, the appended object data may be stored to the object storage system and, at block 612, the object ID and appended object size may be written to metadata storage.

If the modification is an update, processing proceeds to block 614, where an original object ID (ID) and replacement regions are determined. These values may be specified within a modification request, or could be determined in a random or systematic fashion. In some embodiments, the replacement regions are specified using a bitmask that indicates the position of the fixed-size ranges to be updated. At block 616, the object's size is determined, e.g., by retrieving the size from metadata storage. At block 618, an update ID (ID') is determined using any suitable technique, such as one described above in conjunction with the ID generator 210 of FIG. 2.

At block 620, the original object data is reproduced using the original object ID and the object size. At block 622, updated object data is generated using the update ID (ID') and the object size.

At block 624, the update object data is combined with the original object data to produce an updated object. As discussed above in conjunction with FIG. 4, the two data streams may be combined by selectively taking data from each stream according to the specified replacement regions. At block 626, the updated object may be stored in the object storage system. At block 628, the update ID (ID') and replacement regions may be added to the metadata storage for this object.

Depending on the functionality of the object storage system, it may not be necessary to store the entire appended/updated object to the object storage system during testing. For example, some object storage systems allow storing a modified portion of an object and a relative offset within the original object; when the object is read back, the object storage system combines the original object data with the modified portion. Thus, in some embodiments, blocks 610 and/or 626 may include storing only the appended/updated portion of the object and a relative offset to the object storage system.

FIG. 7 shows a process for verifying a test object, in accordance with an embodiment of the disclosure. An illustrative process 700 begins at block 702, where the object ID is received. In some embodiments, the process 700 is performed over a set of test objects and, thus, the object IDs to be tested can be determined by querying metadata storage.

At block 704 the object metadata is retrieved from object storage (e.g., using the object ID). The object metadata may include the object size and information about object modifications. For example, if the object was updated, the retrieved metadata may include an ordered list of tuples, wherein each tuple include an update ID and a bitmask indicating the replacement regions.

At block 706, stored object data is retrieved from the object storage system. This may include sending a read request object storage system, the requesting including the object ID. At block 708, a copy of the original object data is reproduced using the object ID and the object size.

At block 710, updated object data is reproduced by iteratively applying updates (as indicated by the object metadata) to the reproduced original data. For example, assume the object metadata indicates two updates: (ID', mask') and (ID", mask"). Here, processing block 710 may include: (1) generating a first update data stream using first update ID'; (2) replacing regions of the reproduced data by the first update data stream according to the first region mask'; (3) generating a second update data stream using second update ID"; and (5) replacing regions of the reproduced data by the second update data stream according to the second region mask'.

It should be appreciated that, in the case that an object was appended to, but not updated, block 710 can be skipped because the appended object would have been fully reproduced at block 708 using only the object ID and the stored object size (which would correspond to the appended object size S').

At block 712, the reproduced updated object data is compared to the stored object data. At block 714, if the two sets of object data match, the object is verified. Otherwise, data corruption may be reported (block 716).

The processing of blocks 712-716 may be repeated to verify additional objects.

Figure 8:
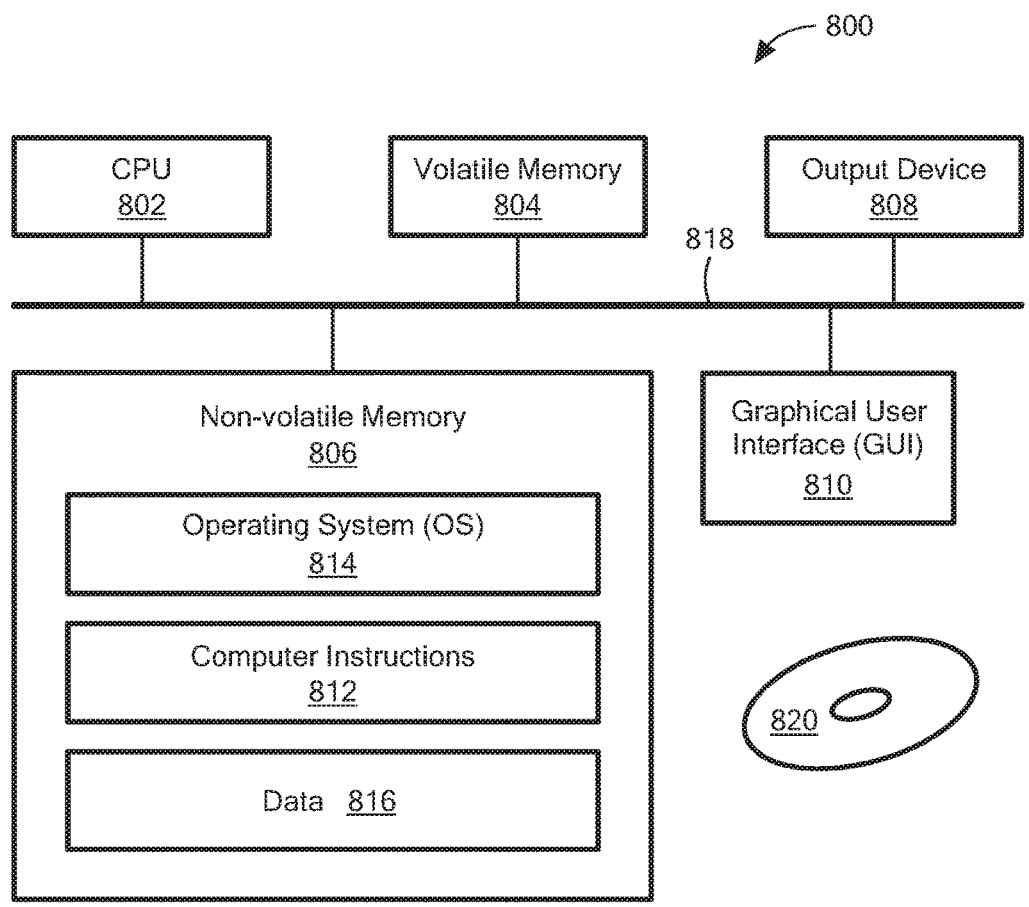
FIG. 8 is a schematic representation of an illustrative computer for use with the systems of FIGS. 1 and 2, in accordance with an embodiment of the disclosure.

FIG. 8 shows an illustrative computer or other processing device 800 that can perform at least part of the processing described herein, in accordance with an embodiment of the disclosure. The computer 800 includes a processor 802, a volatile memory 804, a non-volatile memory 806 (e.g., hard disk), an output device 808 and a graphical user interface (GUI) 810 (e.g., a mouse, a keyboard, a display, for example), each of which is coupled together by a bus 818. The non-volatile memory 806 stores computer instructions 812, an operating system 814, and data 816. In one example, the computer instructions 812 are executed by the processor 802 out of volatile memory 804. In one embodiment, an article 820 comprises non-transitory computer-readable instructions.

Processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that scope of protection sought herein should not be limited to the described embodiments but rather should be limited only by the spirit and scope of the following claims.

What is claimed is:

1. A method for use with a distributed object storage system, the method comprising:
generating, in a processor, a plurality of object IDs and corresponding original object metadata;
for each object ID, generating corresponding original object data in a reproducible manner based upon the corresponding original object metadata, the original object data generated based upon a first object size;
storing the corresponding original object metadata to a metadata storage device and writing the corresponding original object data to the distributed object storage system;
selecting a plurality of the object IDs of the original object data to be mutated; and
for the object IDs to be mutated:
generating corresponding mutated object data in a reproducible manner based upon corresponding mutated object metadata, the mutated object data generated based upon a second object size that is greater than the first object size;
storing the corresponding mutated object metadata to the metadata storage device and writing the mutated object data to the distributed object storage system;
retrieving the object ID and mutated object metadata from the metadata storage device;
reproducing the mutated object data using the mutated object metadata; and
comparing the reproduced mutated object data to the retrieved mutated object metadata to identify corruption in the distributed object storage system.

2. The method of claim 1 wherein mutated object metadata comprises an updated object ID and a bitmask.

3. The method of claim 2 wherein reproducing the mutated object data using the mutated object metadata comprises:
reproducing original object data using the original object metadata;
generating updated object data using the updated object ID; and
combining the reproduced original data and the updated object data according to the bitmask to reproduce the mutated object data.

4. The method of claim 2 wherein mutated object metadata comprises an ordered list of updated object ID and bitmask tuples.

5. The method of claim 4 wherein reproducing the mutated object data using the mutated object metadata comprises:
  reproducing original object data using the original object metadata;
  for each tuple in the ordered list of updated object ID and bitmask tuples, iteratively generating updated object data using the updated object ID and combining the reproduced original data and the updated object data according to the bitmask to generate the reproduce the mutated object data.

6. A system for use with a distributed object storage system, the system comprising:
  a content generator configured to generate object data in a reproducible manner based upon corresponding object metadata, the original object data generated based upon a first object size;
  an object creator configured to:
    generate a plurality of object IDs and corresponding original object metadata;
    for each object ID, generate corresponding original object data using the content generator and the corresponding original object metadata;
    store the corresponding original object metadata to a metadata storage device; and
    write the corresponding original object data to the distributed object storage system;
  an object mutator configured to:
    select a plurality of the object IDs of the original object data to be mutated; and
    for the object IDs to be mutated:
      generate corresponding mutated object data in a reproducible manner using the content generator and the mutated object metadata, the mutated object data generated based upon a second object size that is greater than the first object size;
      store the corresponding mutated object metadata to the metadata storage device; and
      write the mutated object data to the distributed object storage system; and
  a content verifier configure to:
    for the object IDs to be mutated:
      retrieve the object ID and mutated object metadata from the metadata storage device;
      reproduce the mutated object data using the mutated object metadata; and
      compare the reproduced mutated object data to the retrieved mutated object metadata to identify corruption in the distributed object storage system.

7. The system of claim 6 wherein mutated object metadata comprises an updated object ID and a bitmask.

8. The system of claim 7 wherein the content verifier is configured to:
  reproduce original object data using the original object metadata;
  generate updated object data using the updated object ID; and
  combine the reproduced original data and the updated object data according to the bitmask to reproduce the mutated object data.

9. The system of claim 7 wherein mutated object metadata comprises an ordered list of updated object ID and bitmask tuples.

10. The system of claim 9 wherein the content verifier is configured to:
  reproduce original object data using the original object metadata;
  for each tuple in the ordered list of updated object ID and bitmask tuples, iteratively generate updated object data using the updated object ID and combine the reproduced original data and the updated object data according to the bitmask to generate the reproduce the mutated object data.

* * * * *